United States Patent
Liu et al.

(10) Patent No.: US 9,411,849 B2
(45) Date of Patent: Aug. 9, 2016

(54) METHOD, SYSTEM AND COMPUTER STORAGE MEDIUM FOR VISUAL SEARCHING BASED ON CLOUD SERVICE

(71) Applicant: TENCENT TECHNOLOGY (SHENZHEN) COMPANY LIMITED, Guangdong (CN)

(72) Inventors: Hailong Liu, Guangdong (CN); Jie Hou, Guangdong (CN); Pengfei Xiong, Guangdong (CN); Bo Chen, Guangdong (CN); Xiaobo Zhou, Guangdong (CN); Feng Rao, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 14/241,863

(22) PCT Filed: Apr. 9, 2013

(86) PCT No.: PCT/CN2013/073979
§ 371 (c)(1),
(2) Date: Feb. 27, 2014

(87) PCT Pub. No.: WO2014/005451
PCT Pub. Date: Jan. 9, 2014

(65) Prior Publication Data
US 2015/0046483 A1    Feb. 12, 2015

(30) Foreign Application Priority Data
Apr. 25, 2012    (CN) .......................... 2012 1 01238535

(51) Int. Cl.
*G06F 17/30* (2006.01)
*G06K 9/46* (2006.01)
*G06K 9/62* (2006.01)

(52) U.S. Cl.
CPC .... *G06F 17/30386* (2013.01); *G06F 17/30047* (2013.01); *G06F 17/30247* (2013.01); *G06K 9/4671* (2013.01); *G06K 9/6215* (2013.01)

(58) Field of Classification Search
CPC .................. G06F 17/30247; G06F 17/30386; G06F 17/30047; G06F 17/30; G06F 17/30277; G06F 17/30864; G06K 9/6215; G06K 9/4671
USPC .................. 707/758, 706; 382/156, 190, 209
See application file for complete search history.

(56) References Cited

U.S. PATENT DOCUMENTS 5,572,603 A * 11/1996 Koike ....................... G06T 5/20
                                                              382/199
5,659,673 A *  8/1997 Nonoshita ............... G06T 11/00
                                                              345/605

(Continued)

FOREIGN PATENT DOCUMENTS

| CN | 102063436 A | 5/2011 |
| CN | 102395966 A | 3/2012 |
| CN | 102685091 A | 9/2012 |

OTHER PUBLICATIONS

Yanmin Yao, Haiqing Si and Deying Wang—"Object oriented extraction of reserve resources area for cultivated land using RapidEye image data"—Published in: Agro-geoinformatics (Agro-geoinformatics 2014), Third International Conference on Date of Conference: Aug. 11-14, 2014, Beijing, China—pp. 1-4.*

(Continued)

*Primary Examiner* — Anh Ly
(74) *Attorney, Agent, or Firm* — Morrison & Foerster LLP

(57) ABSTRACT

A method, system and computer storage medium for visual searching based on cloud service is disclosed. The method includes: receiving, from a client, an image recognition request of cloud service, the request containing image data; forwarding, according to a set classified forwarding rule, the image data to a corresponding classified visual search service; recognizing, by the respective corresponding classified visual search services, corresponding classified type information in the image data, and determining a corresponding name of the image data in accordance with the respective classified type information, and obtaining a classified visual search result; summarizing and sending, to a client, the classified visual search result of the corresponding classified visual search service. By detection and recognition of the classified type information of the image data, the comprehensive feature information of a picture is obtained, based on which further applications are allowed, and thus the user experience is improved.

18 Claims, 6 Drawing Sheets

(56) References Cited

U.S. PATENT DOCUMENTS

| | | | | |
|---|---|---|---|---|
| 7,817,862 | B2* | 10/2010 | Baba | G06F 17/30256 382/190 |
| 2005/0011959 | A1* | 1/2005 | Grosvenor | G06F 17/30256 235/470 |
| 2006/0039586 | A1* | 2/2006 | Takematsu | G06F 17/30038 382/115 |
| 2007/0106721 | A1* | 5/2007 | Schloter | G06F 17/30864 709/200 |
| 2008/0071749 | A1* | 3/2008 | Schloter | G06F 17/30029 707/E17.014 |
| 2008/0071770 | A1* | 3/2008 | Schloter | G06F 17/30041 707/E17.014 |
| 2008/0080745 | A1* | 4/2008 | Vanhoucke | G06F 17/30253 382/118 |
| 2008/0082426 | A1* | 4/2008 | Gokturk | G06F 17/30256 705/26.62 |
| 2008/0152231 | A1* | 6/2008 | Gokturk | G06F 17/30256 382/209 |
| 2008/0177640 | A1* | 7/2008 | Gokturk | G06Q 30/02 705/26.62 |
| 2008/0212899 | A1* | 9/2008 | Gokturk | G06F 17/30259 382/305 |
| 2008/0267521 | A1* | 10/2008 | Gao | G06K 9/228 382/254 |
| 2008/0268876 | A1* | 10/2008 | Gelfand | G06Q 30/02 455/457 |
| 2010/0211814 | A1* | 8/2010 | Satonaga | G03G 15/5075 714/2 |
| 2010/0278420 | A1* | 11/2010 | Shet | G06K 9/626 382/156 |
| 2010/0278439 | A1* | 11/2010 | Lennington | G06F 17/30247 382/209 |
| 2011/0052017 | A1* | 3/2011 | Suwaki | G06F 19/321 382/128 |
| 2011/0082371 | A1* | 4/2011 | Chono | A61B 6/5217 600/443 |
| 2011/0225196 | A1* | 9/2011 | Haseyama | G06F 17/30781 707/780 |
| 2012/0023131 | A1* | 1/2012 | Downey | G06F 17/30038 707/769 |
| 2012/0106809 | A1* | 5/2012 | Lee | G06K 9/342 382/128 |
| 2013/0136363 | A1* | 5/2013 | Na | G06F 17/30047 382/190 |

OTHER PUBLICATIONS

Edward W. Bork and Jason G. Su—"Integrating LIDAR data and multispectral imagery for enhanced classification of rangeland vegetation: A meta analysis"—Remote Sensing of Environment—vol. 111, Issue 1, Nov. 15, 2007, pp. 11-24.*

International Preliminary Report on Patentability received for PCT Patent Application No. PCT/CN2013/073979, mailed on Nov. 6, 2014, 31 pages (21 pages of English Translation and 10 pages of Official Copy).

International Search Report & Written Opinion received for PCT Patent Application No. PCT/CN2013/073979, mailed on Jul. 18, 2013, 33 pages (21 pages of English Translation and 12 pages of Official Copy).

* cited by examiner

METHOD, SYSTEM AND COMPUTER STORAGE MEDIUM FOR VISUAL SEARCHING BASED ON CLOUD SERVICE

CROSS REFERENCE TO RELATED APPLICATIONS

This application is a continuation application of the PCT International Application No. PCT/CN2013/073979, filed on Apr. 9, 2013, entitled "A METHOD, SYSTEM AND COMPUTER STORAGE MEDIUM FOR VISUAL SEARCHING BASED ON CLOUD SERVICE" by Hailong LIU, Jie HOU, Pengfei XIONG, Bo CHEN, Xiaobo ZHOU and Feng RAO, which claims the priority from the Chinese patent application No. CN201210123853.5, filed on Apr. 25, 2012. The above-referenced applications are hereby incorporated herein in their entireties by reference.

FIELD OF THE INVENTION

The present disclosure relates generally to the field of picture search technology, and more particularly, to a method, system and computer storage medium for visual searching based on cloud service.

BACKGROUND OF THE INVENTION

Visual search refers to processing, recognition and understanding, from visual perspectives, of elements of a specific input picture, and extraction of various types of basic and detailed information of the elements of the picture. The existing internet-based picture search services are mainly provided by some search engines directed to similar pictures. Such services are usually focused on searching for pictures that are similar to an input picture, such as other face images same (or similar) to a face image, and recognition of an object in an image, etc. These services are recognition services belonging to specific recognition fields, which can only provide pictures similar in form, or information of a particular field contained in a picture. It is unable to recognize the detailed and basic information of a picture, and therefore cannot implement further applications based on the recognized detailed and basic information of the picture.

SUMMARY OF THE INVENTION

Based on the above, to address the aforementioned deficiencies and inadequacies, there is a need to provide a method, system and computer storage medium for visual searching based on cloud service, which can recognize and obtain comprehensive feature information of a picture, so as to conduct further applications based on the general characteristic information.

Exemplary embodiments embodying technical solutions to achieve the above objective are discussed below.

According to one aspect of the disclosure, a method for visual searching based on cloud service includes the steps of: receiving, from a client, an image recognition request of cloud service, the request containing image data; forwarding, according to set classified forwarding rule, the image data to a corresponding classified visual search service; recognizing, by the respective corresponding classified visual search service, corresponding classified type information in the image data, and determining a corresponding name of the image data in accordance with the respective classified type information to obtain a classified visual search result, the result including the classified type information and the corresponding name; and summarizing and sending, to a client, the classified visual search result of the corresponding classified visual search service.

According to a further aspect of the disclosure, a system for visual searching based on cloud service includes a server, the server including: a cloud service access device, configured to receive from a client an image recognition request of cloud service, the request containing image data, and forward, according to set classified forwarding rule, the image data to a corresponding classified visual search service in a classified visual service system; a classified visual service system, configured to recognize, by the respective corresponding classified visual search service, corresponding classified type information in the image data, and determine a corresponding name of the image data in accordance with the respective classified type information to obtain a classified visual search result, the result including the classified type information and the corresponding name; and a visual search results summarization device, configured to send, upon summarization, the respective corresponding classified visual search results to a client.

According to a further aspect of the disclosure, based on the image recognition request of cloud service received from a client, the image data contained in the request is forwarded to a corresponding classified visual search service according to set classified forwarding rule. The respective corresponding classified visual search service recognizes the classified type information in accordance with the image data, determines the name of the respective classified type information, and sends, upon summarization, the classified visual search result of the corresponding classified visual search service to a client. By recognition of the classified type information of the image data based on the respective classified visual search service, the comprehensive feature information of an image is obtained, based on which further applications are allowed, thus improving the user experience.

DETAILED DESCRIPTION OF THE PREFERRED EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

1. Embodiment 1

Figure 1:
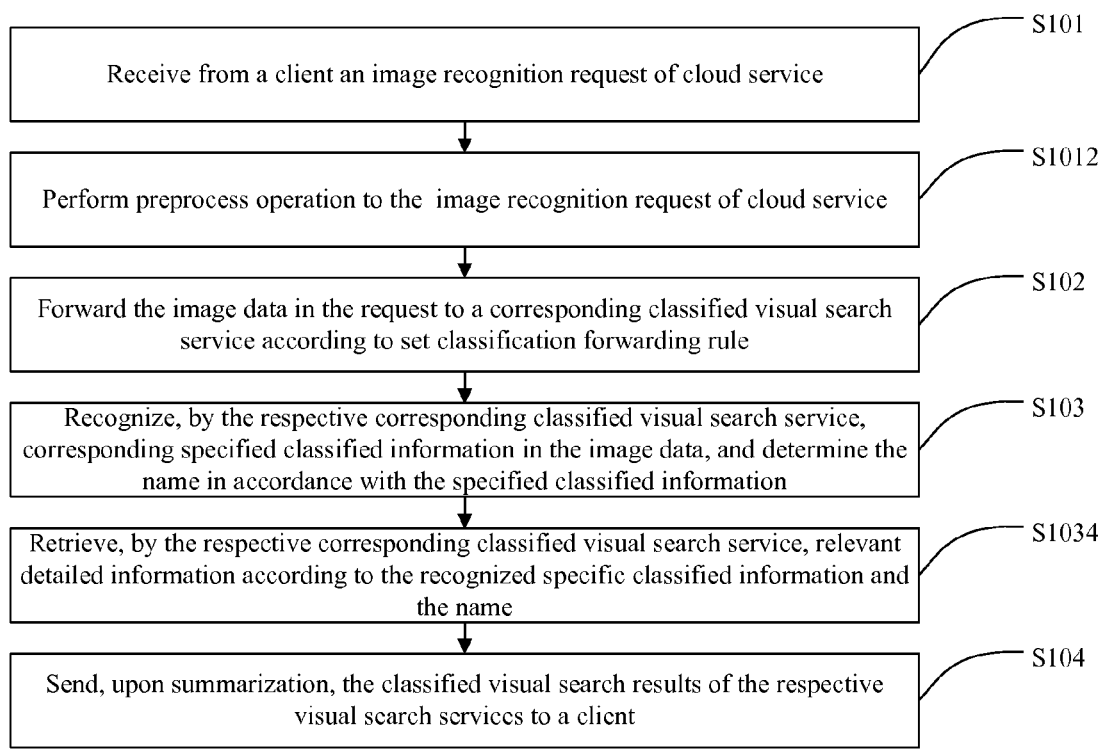
FIG. 1 is a schematic diagram showing a method for visual searching based on cloud service according to a first embodiment of the present disclosure.

FIG. 1 illustrates a method for visual searching based on cloud service according to the first embodiment of the present disclosure. In this embodiment, it is illustrated with the example of detecting, by the respective classified visual search service, whether the image data contains the corresponding specific classified type information.

As illustrated in FIG. 1, the method according to the embodiment includes the steps of:

Step S101: receiving, from a client, an image recognition request of cloud service, the request containing image data that needs image recognition;

Step S102: forwarding, according to set classified forwarding rule, the image data in the request to a corresponding classified visual search service;

Step S103: detecting, by the respective corresponding classified visual search service, whether the corresponding classified type information is contained in the image data; when it is contained, recognize the corresponding classified type information in the image data, and determine the name corresponding to the classified type information;

Step S104: sending, upon summarization, the classified visual search result of the respective corresponding classified visual search service to a client, the result including the classified type information determined by the above detecting step and the determined corresponding name.

According to the above embodiment of the present disclosure, based on the image recognition request of cloud service received from a client, the image data contained in the request is forwarded to a corresponding classified visual search service according to set classified forwarding rule. The respective corresponding classified visual search service recognizes the classified type information in accordance with the image data, determines the name of the respective classified type information, and sends, upon summarization, the classified visual search result of the corresponding classified visual search service to a client. By recognition of the classified type information of the image data based on the respective classified visual search service, the comprehensive feature information of an image is obtained, based on which further applications are allowed, thus improving the user experience.

The above classified visual search services may include services in a variety of specific areas. Different settings can be done depending on the specific needs, for example, it may include but not limited to, services of the following categories: object visual search service, text visual search service, face visual search service, barcode visual search service, scenery visual search service, Logo visual search service, book visual search service, CD (i.e., compact disc) visual search service, etc. In case of implementation, any one or any combination of these categories of visual search services can be used.

Correspondingly, the classified type information is in accordance with the corresponding classified visual search service, the above classified type information may include types of object, text, face, barcode, scenery, Logo, books, CD and other types. In case of implementation, in accordance with the different types of visual search services used above, the classified type information may include any one or any combination of the types of object, text, face, barcode, scenery, Logo, books, CD, etc.

Based on this, the technical solution of the present embodiment presents high scalability when implementing. It is possible to add any of various types of the classified visual search services, and the various types of visual search services can be implemented using conventional techniques.

Meanwhile, the client for sending image recognition request of cloud service can be of any type including but not limited to: mobile terminal, PC client, WEB client, tablet PC, notebook computer, automotive electronic system, PDA, etc.

In addition, in the present embodiment, it allows the user to specify the types of classified visual search services to be conducted to the sent image data, such as conducting only face visual search service or scenery visual search service, etc. Therefore, the classified forwarding rule can be set as followings:

detecting whether the image recognition request of cloud service contains the classified type information;

when the classified type information is contained, it indicates that the user needs to conduct classified visual search service of a specified type; thus, forward the image data to the respective classified visual search service corresponding to the classified type information;

when no classified type information is contained, it may indicate that the user does not limit the type of classified visual search service, or visual search services of all types are required; thus, forward the image data to all the classified visual search services.

In a specific implementation, upon receiving the image recognition request of cloud service sent by the client, the request can be preprocessed to verify its security. Based on this, as shown in FIG. 1, the method may comprise, between Step S101 and Step S102, the step of:

Step S1012: preprocessing the image recognition request of cloud service.

The preprocess operations mainly include verification of the image recognition request of cloud service. For example, determine whether the request is valid, so as to avoid any illegal access request. Security verification can be implemented in a conventional manner, which will not go into detail here.

In an implementation of one embodiment of the present disclosure, the method may further include, after forwarding the image data to the corresponding classified visual search service, and at the same time of recognition of the corresponding classified type information in the image data by respective corresponding classified visual search service, the step of:

detecting, by the respective corresponding classified visual search service, whether the image data contains the corresponding classified type information;

if it is contained, detect the position information of the classified type information in the image data, the position information can be a coordinate range of the classified type information with respect to the image data; then, based on the position information detected by the respective corresponding classified visual search service, recognize the classified type information represented by the image data corresponding to the position information;

if it is not contained, then the current classified visual search service ends the visual search process.

The method according to the embodiment may include, based on the comprehensive feature information recognized and obtained, further comprehensive application in order to improve the user experience. That is, the method may further include, between Step S103 and Step S104, the step of:

Step S1034: retrieving, by respective classified visual search services and based on the recognized classified type information and the corresponding name, relevant detailed information. In this case, the visual search results sent to the client contain the detailed information retrieved at this time.

A specific example will be illustrated in detail in the following description. In this example, it is not specified in the request sent by the client which type of classified visual search service will be conducted to the image data; the description, however, shall not be understood as limitative to the scope of the present disclosure.

Figure 2:
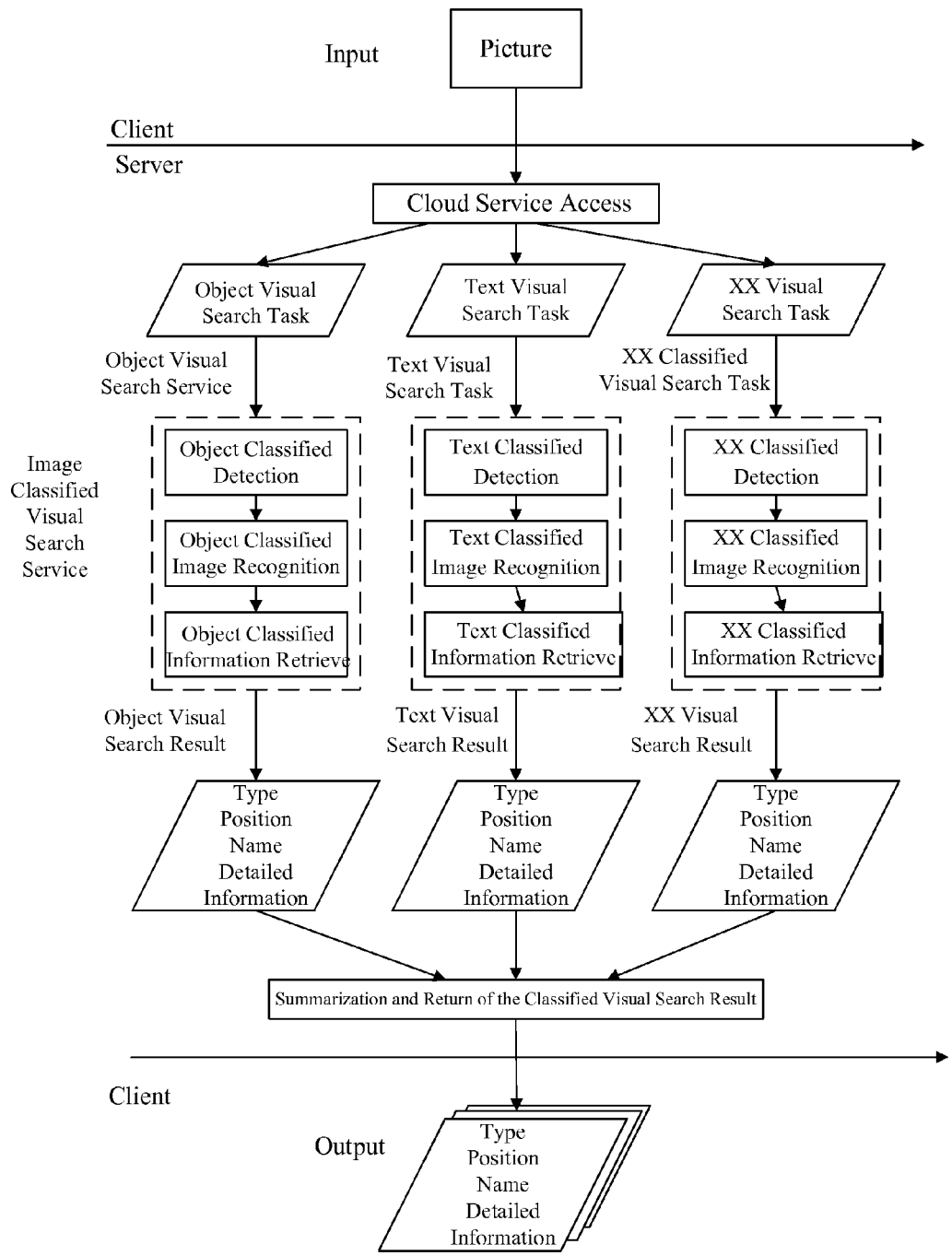
FIG. 2 shows an example according to the overall flow of the method of FIG. 1.

FIG. 2 is a schematic diagram showing an overall flow of the specific example. In FIG. 2, considering the space limitations, only the object and the text visual search services are illustrated, and the other types are referred to as XX visual search services. Meanwhile, the other types of visual search services can be configured according to actual needs.

As shown in FIG. 2, the specific process of example can be described as follows.

A client sends to a server via a network (e.g. Internet) an image recognition request of cloud service, wherein the request contains the image data of the picture to be visually searched.

Upon receiving the image recognition request of cloud service, the server performs preprocess operation to the request, verifies its security, and determines whether the request is valid. If the security verification is passed, then enter the next step. Otherwise, end the processing of the request, or return to the client feedback of error or illegal request.

After passing the security verification, the server analyzes to determine whether the image recognition request of cloud service contains the classified type information, i.e., determining whether the user has specified a certain type of classified visual search service. If there is a specified service, then forward the image data in the request to the respective classified visual search service corresponding to the classified type information; and if there is no specified service, then forward the image data in the request to all the classified visual search services, respectively.

In this specific example of the embodiment, it is not specified in the request which type of classified visual search service will be conducted to the image data. That is, in this example, the image data in the request is forwarded to all the classified visual search services, respectively. Due to different specific settings, the visual search services contained in the server may vary and may not be exhaustive. As a result, in the following description, all the visual search services including face visual search service, physical visual search service, text visual search service are taken as an example, and the description shall not be understood as limitative to the scope of the present disclosure.

Upon receiving the forwarded image data, the face visual search service firstly detects to determine whether a face image is contained in the image data. If no face image is contained therein, then end the face visual search service. If any face image is contained, then determine the position information of the face image in the picture corresponding to the image data. The position information usually includes a coordinate range of the region of the face image in the picture. Then, based on the position information, recognize the specific face image, give the name in accordance with the face image, and search in a corresponding database for detailed information in accordance with the recognized face image. For example, other face images similar to the face image, name of the person in the face image, etc. Based on the name searched out, biography of the person as well as other relevant information can further be searched out. For example, when the person is a star (e.g., a famous person), link addresses (such as home address, blog address, microblog address, etc.) associated with the star can be obtained. Finally, the face visual search results can be obtained, which may include the type information, i.e. human face, position information of the face in the picture, name of the face and other relevant information searched out in the above process.

Upon receiving the forwarded image data, the object visual search service firstly detects to determine whether an object is contained in the image data. If no object is contained therein, then end the object visual search service. If any image of the object is contained, then determine the position information of the object in the picture corresponding to the image data. The position information usually includes a coordinate range of the region of the object in the picture. Then, based on the position information, recognize the specific image of the object, match the object to a specific category and obtaining other relevant information based on the image of the object, and then search in a corresponding database for detailed information in accordance with the recognized object, such as year of production of the object, etc. Finally, the object visual search results can be obtained, which may include the type information, i.e. object, position information of the object in the picture, name of the object and other relevant information searched out in the above process.

Upon receiving the forwarded image data, the text visual search service firstly detects to determine whether text content is contained in the image data. If no text content is contained therein, then end the text visual search service. If any text content is contained, then determine the position information of the text content in the picture corresponding to the image data. The position information usually includes a coordinate range of the region of the text content in the picture. Then, based on the position information, recognize the specific text content, and search in a corresponding database for detailed information in accordance with the text content. For example, when the text content includes website information, then indicate the specific link address, etc. Finally, the text visual search results can be obtained, which may include the type information, i.e. text, position information of the text in the picture, name of the text and other relevant information searched out in the above process.

After getting the classified visual search results of the face, object and text visual search services, the results are returned to the client after summarization. Upon receiving the results by the client, there can be various implementations according to actual needs, so as to provide a variety of subsequent interaction operations based on the returned results and various different product forms.

For example, according to the returned classified visual search results, a variety of information is obtained by classification recognition from the picture using different types of returned data fields.

With the use of position information in the returned data, the position of each element in the picture is framed, so as to provide a more intuitive result.

The name and detailed information are listed in the form of text list to facilitate a user to quickly understand various elements of the picture. The text information can also be listed in each element box in the picture.

In addition, with respect to the result corresponding to each type of information, different ways of additional interaction can also be provided according to the unique characteristics of each type.

With respect to the result of text visual search service, it may include determining whether it is a foreign language, such as English, French, Japanese, etc.; when it is, then additional translation function may be provided. Moreover, if the text is a web link, then click on a position corresponding to the text to visit the website of the link by opening the link directly by a browser.

With respect to the result of barcode visual search, it may further include detecting the category of the barcode. If the barcode is a one-dimensional code, then it can be set as: when clicking on the recognition result of the one-dimensional code, directly link to a product corresponding to the barcode in a shopping site, so as to facilitate a user to directly purchase this product. If the bar code is a two-dimensional code, interaction operations similar to text visual search can be provided based on the recognized type of text.

With respect to the result of object visual search, determine according to the type of the object. If the object is a well-known trademark, then a basic introduction to it can be provided, and the corresponding company's official website can be linked by clicking on the corresponding position of the well-known trademark in the picture. If it is a place of interest, further introduction and ticket information of the site can be provided; a user can directly view the tourism strategy by clicking on the corresponding position of the site in the picture. If it is a book or CD, then the author and introduction to the content of the book or CD can be provided; a user can buy the book or CD directly by clicking on corresponding position of the book or CD in the picture.

With respect to the result of human face visual search, when it is a star face, then the star's life and introduction to his/her work can be provided; relevant webpage of the star, such as home address, blog address and microblog address, etc, can be linked by clicking on the corresponding position of the face in the picture. If it is a friend's face, then the user can view more pictures of the friend by clicking on the corresponding position of the friend's face in the picture. If it is an ordinary human face, then the person's sex, age and other identifying information can be provided, even with entertainment scoring functions including increasing the beauty or ugliness.

According to actual needs, there can be a variety of other different types of expansion modes, which will not go into details herein.

The detection and recognition of face image of the above face visual search service can be conducted in a conventional manner. In a specific example, the face visual search service may include the following procedures: face detection, the key point positioning, image normalization, feature extraction and face feature template comparison. The four procedures of face detection, the key point positioning, image normalization and feature extraction can be referred to as face feature template extraction. The following is a brief description of each procedure.

Face detection refers to detecting whether there is a human face in the acquired image or video. In case of a face is detected, mark the specific location of the face to obtain a candidate face region. Specifically, the Haar-like adaboost algorithm can be implemented to achieve accurate positioning of face in the image from −30 to 30 degrees small gesture.

The key point positioning refers to marking, on the candidate face region of the acquired image (video), eyes, mouth and other key locations. Specifically, the candidate eyes and mouth regions can be obtained by image projection. The accurate eye center coordinate can be obtained by using Haar-like adaboost algorithm in the eye region, and for accurate mouth coordinate, Gabor-like adaboost algorithm can be used in the mouth region.

The purpose of image normalization is to obtain an aligned face template in an effective region, and the interference of external factors such as light are eliminated. Image normalization includes pose normalization and illumination normalization. Pose normalization refers to, based on the obtained position of the eyes and mouth, conducting normalization operations such as clipping, scaling and posture correction, etc., so as to allow distortion of original image into a standard face template. This ensures that the eyes and the mouth are in the standard position. Illumination normalization refers to the de-illumination operation of an image.

Feature extraction refers to extraction of features in a size and illumination normalized image, including Gabor local features, LBP (Local Binary Patterns) and global block feature of HOG (Histogram of Oriented Gradient). Image features are expressed by the dimensionality reduction and in turn series connection of LDA (Linear Discriminant Analysis) of the three types.

Comparison of face feature templates refers to determining the similarity between two candidate feature templates. During face verification, it is determined that the verification is passed if the similarity of two feature templates exceeds a set threshold, i.e., the two feature templates are similar. During face recognition, it is determined that the recognition is passed if the greatest similarity exceeds a given threshold, and the face ID corresponding to the maximum similarity is the recognition result.

The above specific example only describes one way for conducting face visual search. According to actual needs, any other possible ways can also be used to achieve human face visual search services, which will not go into details here.

Accordingly, the above procedures of detection and recognition of an object by object visual search service can be conducted in different ways. In one specific example, the object visual search service may include three stages of image feature extraction, feature matching and geometric verification. Each stage will be described briefly in the following description, respectively.

When performing feature extraction, firstly extract the SIFT features (Scale-invariant feature transform) on the image. The SIFT features enable an image to remain unchanged when subject to rotation, scaling, illumination change and other factors, and present relatively good stability with regard to changes of viewing angle, affine transformation, noise and other factors. Specifically, the SIFT feature extraction can be achieved by the following steps.

Firstly, detect the extreme value of a scale space. In order to effectively extract the stable key points, Difference of Gaussian ("DOG") of different scales is used to obtain the convolution of the original image.

$$D(x,y,\sigma)=(G(x,y,k\sigma)-G(x,y,\sigma))*I(x,y)=L(x,y,k\sigma)-L(x,y,\sigma)$$

For this reason, there is need to establish a Gaussian image pyramid. The pyramid includes in total P groups, each group having S layers; images of each layer of the first group are obtained by convolution of the original image and Gaussian kernel of different scales (scales of adjacent layers differ by a scaling factor k), and the images of the next group are obtained by down-sampling of the images of the previous group. The DOG pyramid is obtained by subtraction of adjacent Gaussian image pyramids.

To seek the extreme value point of a scale space, each sampling point of the DOG pyramid will be compared with eight adjacent points of the same scale and a total 9*2 of 26 points corresponding to the up and down adjacent scales. If the value of the sampling point is less than or greater than its 26 adjacent points, then the point is a local extreme value point (called the key point).

Secondly, accurately position the key point. The location and scale of the key point can be determined accurately by fitting of three dimensional quadratic function, and key points of low contrast and unstable corresponding point on the edge are removed, so as to enhance the stability of feature matching and improve the ability to resist noise. The accurate positioning of key points includes determination of main direction of key points and generation of key point descriptor.

When determining the main direction of a key point, samples are taken in a window of the neighborhood field of which the center is the key point, and the gradient direction of pixels is determined by histogram. The range of the gradient histogram is 0 to 360 degrees, wherein 10 degrees represent a column, in total of 36 columns. The main peak value of the histogram (maximum peak value) represents the main direction of the neighborhood gradient of the key point, i.e., the main direction of the key point. In the gradient direction histogram, when there is another peak value having energy equal to 80% of that of the main peak value, this direction will be deemed as an auxiliary direction of the key point.

When generating the descriptors of the key point, firstly the zero direction of the axis is rotated to the main direction of the key point, in order to obtain rotational invariance. Then, take the key point as the center to obtain a window of 16*16, and calculate the gradient direction histogram of eight directions on each piece of 4*4. The accumulated values of each gradient direction are counted to form a seed point. Each key point can be described by a total of 16 (4*4) seeds, such that 128 data can be generated for a key point, i.e., eventually forming 128-dimensional SIFT feature vector. At this point, the effects to the SIFT feature vector such as geometric distortion, rotation and other distortion factors are removed. Finally, length normalization is performed to the feature vector, further removing the influence of illumination change.

During the feature matching, the feature collection extracted from a training set of images are processed using Hierarchical k-means clustering method, which can generate a hierarchy word tree with depth of L and the branch number of k. Each leaf node becomes a visual word, and the number of leaf nodes are kL, typically k=8 or 10, L=6 or 7.

After extracting features of images, calculate which leaf node of the hierarchy word tree is closest to the feature vector of the key point (just kL times dot product calculation is needed), by which the feature vector is converted in to a word. Thus, a picture can be represented by a document vector, and each dimension of the document vector corresponds to a visual word, with its value indicating the importance of the visual word to this document, commonly using TF-IDF (term frequency-inverse document frequency) weights.

Query the similarity between the picture and pictures of objects in the database, which can be measured by the distance of the two document vectors in a vector space (L1 distance, L2 distance, cosine similarity, etc.). For quickly matching and queries among the mass pictures of objects in the database, an inverted index is built up for all pictures of objects in the database. That is, use the word number as an index, record which database picture number corresponds to each word, and the number of occurrences of the word in these databases pictures. As a result, the matching process becomes plus and voting to those databases pictures that contain the queried picture word. The s pictures most similar matching to the queried picture are selected as candidate pictures of objects, and are returned as a result of feature matching stage.

Then, enter the geometric verification process. During the geometry verification, for the s candidate pictures of objects in the front during the feature matching stage, further exact matching is made between the geometric position information of the feature point and the inquired picture. The nearest neighbor algorithm is used for calculating the point matching relationship between the inquired picture and the database pictures, and the RASANC algorithm (Random Sample Consensus) is used to filter from the matching points the pair of mismatch points (outside points) that do not meet the constraints of affine transformation, leaving comply the pair of mismatch points (inside points) that meet the constraints of affine transformation, and meanwhile estimate the affine transformation matrix from the queried picture to the database pictures. The s candidate pictures of objects are reordered according to a descending order of the number of pairs of inside points. If the pairs of inside points of the preferred matching object exceed a certain threshold value Th (Th can be about 10), then it is determined that the matching is successful, otherwise the result of rejection is given. In this process, using the affine transformation matrix obtained by RANSAC algorithm, and a coordinate of the inside point, it is possible to calculate the position of the object in the queried picture.

The above specific example only describes one way for conducting object visual search. According to actual needs, any other possible ways can also be used to achieve object visual search service, which will not go into details here.

Accordingly, the above process of detection and recognition of text content by text visual search service can be implemented in a conventional manner. In one specific example, the text visual search service may include stages of text detection, layout analysis, regional binary, regional line segmentation, character segmentation and character recognition as followings.

Text detection refers to analysis using connected domain to obtain the position of text block from an image.

Layout analysis refers to dividing of an input document into regions of the same property, usually including graphics, images, tables, and text; for text, it is also needed to determine the direction of the text.

Regional binarization refers to processing of the regions obtained by layout analysis. When implementing, the type of horizontal text may also be considered to conduct image binarization.

Regional line segmentation refers to horizontal projection, by detection and classification of the connected component, of part of the connected component. The text region is divided into sub-regions, and multi-line the sub-regions are detected. By using the connected component merge method, the text of the multi-line sub-region is segmented. Finally, the connected component adhered between lines are cut, and small connected component is classified into the text line it belongs to based on the distance information.

As for character cutting, the segmentation methods are different according to text features of different languages. For example, for European text and Arabic text, it is usually calculated using the baseline to find a cut-off point, while there is no concept about baseline in printed text of Chinese, Japanese, and Korean.

Character recognition refers to classifying, by feature extraction of the character image, of the character types using multi-template Euclidean distance classifier, so as to recognize the text result of characters.

The above specific example only describes one way for conducting text visual search. According to actual needs, any other possible ways can also be used to achieve text visual search service, which will not go into details here.

In the above description, for the object visual search service, face visual search service, and text visual search service, only one implementation for each service is described in detail. Other types such as barcode visual search service, Logo visual search service, scenery visual search service, book visual search service, CD visual search service, etc., can also be implemented in a conventional manner, which will not go into details here.

In one implementation of the embodiment of the present disclosure, the client can be chosen as one that can be located. When sending, by a client, an image recognition request of cloud service to the server, the position information (such as the latitude and longitude information, etc.) of the client can also be sent to the server, and when the server returns a classified visual search result to the client, other relevant information can also be given simultaneously based on the position information. Take the scene visual search service for example, when the scene and the location of the scene are determined, the route information to the scene can be given based on the position information of the place where the client is.

2. Embodiment 2

Figure 3:
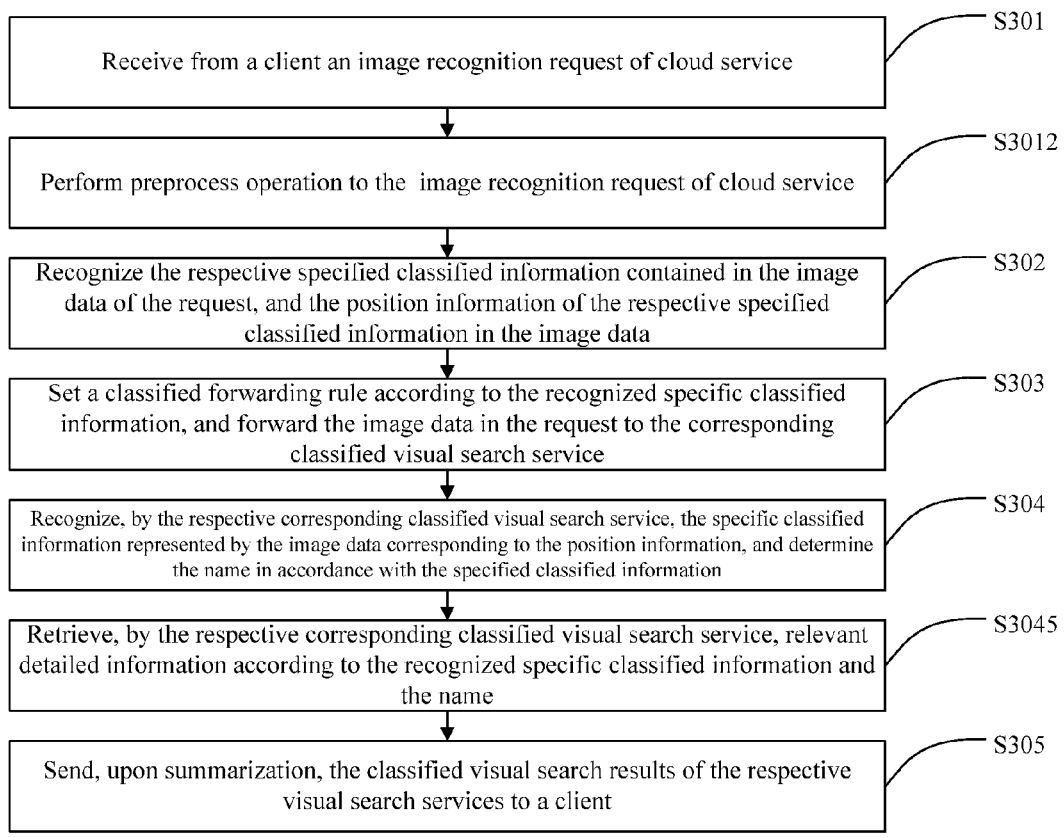
FIG. 3 is a schematic diagram showing a method for visual searching based on cloud service according to a second embodiment of the present disclosure.

FIG. 3 illustrates a method for visual searching based on cloud service according to the second embodiment of the present disclosure. The difference between this embodiment and the first embodiment mainly lies in, firstly determining what classified type information is contained in the image data, and then forwarding the image data to the corresponding classified visual search service.

As illustrated in FIG. 3, the method according to the embodiment includes the steps of:

Step S301: receiving, from a client, an image recognition request of cloud service, the request containing image data that needs image recognition;

Step S202: detecting the respective classified type information contained in the image data of the request, and the position information of the respective classified type information the image data;

Step S303: forwarding, according to a classified forwarding rule established in accordance with the respective recognized classified type information, the image data in the request and the corresponding position information to a corresponding classified visual search service; when forwarding, the position information corresponding to the detected classified type information can also be sent to a corresponding classified visual search service;

Step S304: recognizing, by the respective classified visual search service, the classified type information represented by image data corresponding to position information, and determine the name corresponding to the classified type information;

Step S305: sending, upon summarization, the classified visual search result of the respective corresponding classified visual search service to a client, the result including the classified type information determined by the above detecting step and the determined corresponding name.

According to this embodiment, firstly determine what classified type information is contained in the image data, and then forward the image data to the corresponding classified visual search service. This avoids the unnecessary processing of other classified visual search services.

In a specific implementation, upon receiving the image recognition request of cloud service sent by the client, the request can be preprocessed to verify its security. Thus, as shown in FIG. 3, the method may comprise, between Step S301 and Step S302, the step of:

Step S3012: preprocessing the image recognition request of cloud service.

The preprocess operations mainly include verification of the image recognition request of cloud service. For example, determine whether the request is valid, so as to avoid any illegal access request. Security verification can be implemented in a conventional manner, which will not go into detail here.

In addition, in the present embodiment, it allows the user to specify the types of classified visual search services to be conducted to the sent image data, such as conducting only face visual search service or scenery visual search service, etc. At this time, the image data can be forwarded directly to the specified classified visual search services without the above detection of what classified type information is contained in the image data. Therefore, the method may comprise, after preprocessing of the image recognition request of cloud service, the following steps:

detecting whether the image recognition request of cloud service contains the classified type information;

when the classified type information is contained, it indicates that the user needs to conduct classified visual search service of a specified type; thus, forward the image data to the respective classified visual search service corresponding to the classified type information;

when no classified type information is contained, it may indicate that the user does not limit the type of classified visual search service, or visual search services of all types may be required; thus, implement the detection process of Step S302.

In an implementation of one embodiment of the present disclosure, the types of classified type information contained in the image data are detected in Step S302. After forwarding the image data to a corresponding classified visual search service, it is possible not to detect whether or not the image data contains corresponding classified type information when recognizing the corresponding classified type information of the image data by the respective classified visual search service, which may specifically include:

recognize, based on the position information detected by the respective corresponding classified visual search service, the classified type information represented by the image data corresponding to the position information.

Nevertheless, if the user specifies the classified visual search service to be conducted to the sent image data, and what classified type information is contained in the image data is not detected, then it is necessary to detect whether the image data includes corresponding classified type information when recognizing the corresponding classified type information included in the image data by the corresponding classified visual search service, which specifically includes:

detecting, by the respective corresponding classified visual search service, whether the corresponding classified type information is contained in the image data;

when it is contained, detect the position information of the classified type information in the image data; then, based on the position information detected by the respective corresponding classified visual search service, recognize the classified type information represented by the image data corresponding to the position information;

when it is not contained, then the current classified visual search service ends the visual search process.

The method according to the embodiment may include, based on the comprehensive feature information recognized and obtained, further comprehensive application in order to improve the user experience. That is, the method may further include, between Step S304 and Step S305, the step of:

Step S3045: retrieving, by respective classified visual search services and based on the recognized classified type information, detailed information relevant to the classified type information. In this case, the visual search results sent to the client contain the detailed information retrieved at this time.

A specific example will be illustrated in detail in the following description. In this example, it is not specified in the request sent by the client which type of classified visual search service will be conducted to the image data; the description, however, shall not be understood as limitative to the scope of the present disclosure.

In this specific example, the specific process of example can be described as follows.

A client sends to a server via a network (e.g. Internet) an image recognition request of cloud service. The request contains the image data of the picture to be visually searched.

Upon receiving the image recognition request of cloud service, the server performs preprocess operation to the request, verifies its security, and determines whether the request is valid. If the security verification is passed, then enter the next step. Otherwise, end the processing of the request, or return to the client feedback of error or illegal request.

After passing the security verification, the server analyzes to determine whether the image recognition request of cloud service contains the classified type information, i.e., determining whether the user has specified a certain type of classified visual search service. If there is a specified service, then forward the image data in the request to the respective classified visual search service corresponding to the classified type information; and if there is no specified service, then detect what classified type information is contained in the image data, and detect the position information of the respective classified type information in the picture corresponding to the image data, and forward the image data in the request and the corresponding position information to the corresponding classified visual search services, respectively.

In this specific example of the embodiment, it is not specified in the request that which type of classified visual search service will be conducted to the image data, and the classified type information contained in the image data includes face, object and text. That is, in this example, the image data in the request is forwarded to the face, object and text visual search services, respectively.

Upon receiving the forwarded image data, the face visual search service recognizes a specific face image based the detected position information of the face in the picture corresponding to the image data, gives the name in accordance with the face image, and searches in a corresponding database for detailed information in accordance with the recognized face image. For example, other face images similar to the face image, name of the person in the face image, etc. Based on the name searched out, biography of the person as well as other relevant information can further be searched out. For example, when the person is a star, link addresses (such as home address, blog address, microblog address, etc.) associated with the star can be obtained. Finally, the detailed face visual search results can be obtained, which may include the type information, i.e. human face, position information of the face in the picture, name of the face and other relevant information searched out in the above process.

Upon receiving the forwarded image data, the object visual search service recognizes a specific image of the object based the detected position information of the object in the picture corresponding to the image data, match the object to a specific category and obtaining other relevant information based on the image of the object, and then search in a corresponding database for detailed information in accordance with the recognized object, such as year of production of the object, etc.

Finally, the object visual search results can be obtained, which may include the type information, i.e. object, position information of the object in the picture, name of the object and other relevant information searched out in the above process.

Upon receiving the forwarded image data, the text visual search service recognizes the specific text content according to the position information of the text in the picture corresponding to the detected text, and searches to determine other information relevant to the text content. For example, when the text content website information, then indicate the specific link address, etc. Finally, the text visual search results can be obtained, which may include the type information, i.e. text, position information of the text in the picture, name of the text and other relevant information searched out in the above process.

After getting the classified visual search results of the face, object and text visual search services, the results are returned to the client after summarization. Upon receiving the results by the client, the results can be shown in combination with a picture. Take human face for example, based on the position information of face in the picture, the type information, name of the face and other relevant information can be displayed within the range corresponding to the picture, so that user can view on the client more information related to the picture. If the returned classification of visual search result has link information therein, the user can access a specific page by clicking on the link. Specific extension after obtaining the classified visual search results can be set as many ways according to actual needs, which will not go into details herein.

Other features of the second embodiment are the same as that of the first embodiment, which will not go into details herein.

According to the method for visual searching based on cloud service in accordance with the above embodiment, a system for visual searching based on cloud service is also provided. Following is the detailed description of the embodiments of the system.

Embodiment 1

Figure 4:
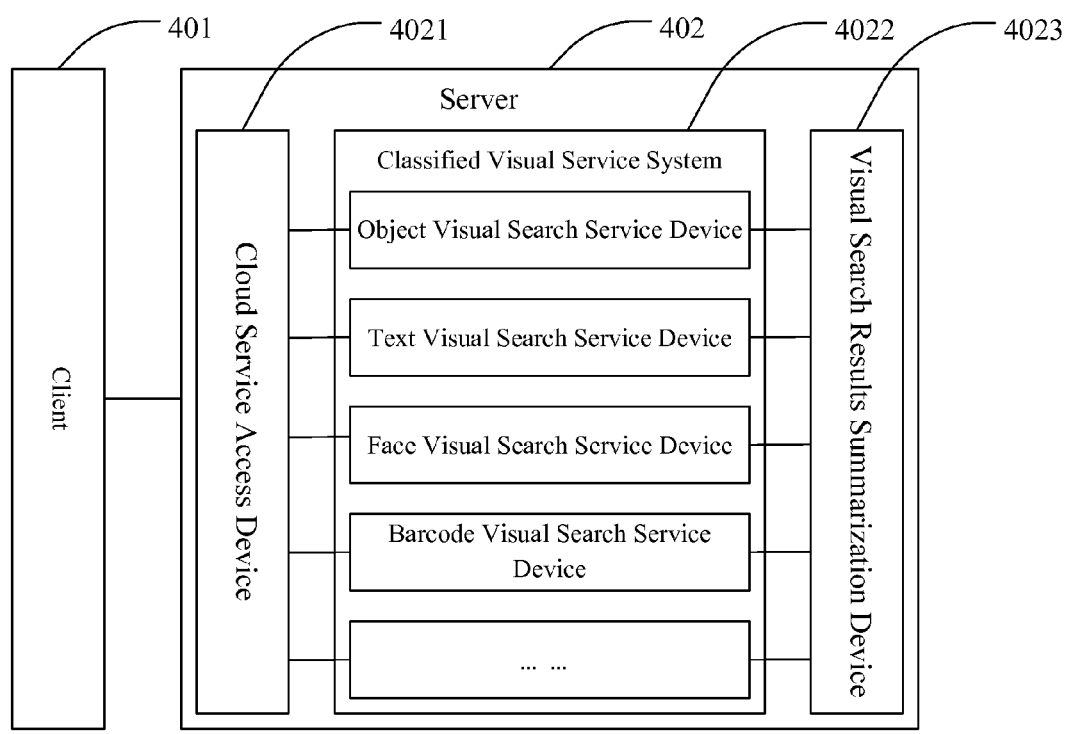
FIG. 4 is a structural schematic diagram showing a system for visual searching based on cloud service according to the first embodiment of the present disclosure.

FIG. 4 is a structural schematic diagram showing a system for visual searching based on cloud service according to the first embodiment of the present disclosure. In this embodiment, it is illustrated with the example of detecting, by the respective specific types of visual search service device, whether the image data contains the corresponding specific classified type information.

As illustrated in FIG. 4, a visual search system based on cloud service in accordance with the embodiment includes a server 402, the server 402 including:

a cloud service access device 4021, configured to receive from the client 401 an image recognition request of cloud service, the request containing image data that needs image recognition, and forward, according to a set classified forwarding rule, the image data contained in the request to a corresponding classified visual search service in a classified visual service system 4022;

a classified visual service system 4022 connected to the cloud service access device 4021, configured to receive the image data sent by the cloud service access device 4021, and recognize, by the respective corresponding classified visual search service, corresponding classified type information in the image data, and determine the name of the image data in accordance with the respective classified type information; and a visual search results summarization device 4023 connected to the classified visual service system 4022, configured to send, upon summarization, the respective corresponding classified visual search results to the client 401, the result including the above determined the classified type information and the corresponding name.

According to the embodiment, based on the image recognition request of cloud service received from the client 401, the image data contained in the request is forwarded, by the cloud service access device 4021 of the server 402, to a corresponding classified visual search service in classified visual service system 4022 according to set classified forwarding rule. Then, the respective corresponding classified visual search service recognizes the classified type information in accordance with the image data, determines the name of the respective classified type information, and sends, upon summarization, the classified visual search result of the corresponding classified visual search service to a client 401. By recognition of the classified type information of the image data based on the respective classified visual search service, the comprehensive feature information of an image is obtained, based on which further applications are allowed, thus improving the user experience.

The above classified visual search services may include services in a variety of specific areas. Different settings can be done depending on the specific needs, for example, it may include, but is not limited to, services of the following categories: object visual search service, text visual search service, face visual search service, barcode visual search service, scenery visual search service, Logo visual search service, book visual search service, CD visual search service, etc. In case of implementation, any one or any combination of these categories of visual search services can be used.

Correspondingly, the classified type information is in accordance with the corresponding classified visual search service, the above classified type information may include types of object, text, face, barcode, scenery, Logo, books, CD and other types. In case of implementation, in accordance with the different types of visual search services used above, the classified type information may include any one or any combination of the types of object, text, face, barcode, scenery, Logo, books, CD, etc.

Based on this, the technical solution of the present embodiment presents high scalability when implementing. It is possible to add any of various types of the classified visual search services, and the various types of visual search services can be implemented in a conventional manner.

Accordingly, in the present embodiment, the above classified visual service system 4022 may specifically include but not limited to, as shown in FIG. 4, specific types of visual search service devices such as object visual search service device, face visual search service device, text visual search service device, barcode visual search service device, etc. It may further includes for example scenery visual search service device, Logo visual search service device, book visual search service device and CD visual search service device, etc.

The object visual search service device is configured to detect and determine whether the image data contains an object. If no object is contained therein, then end the object visual search service. If any object is contained, then determine the position information of the object in the picture corresponding to the image data; based on the position information, recognize the specific image of the object, and match the object to a specific name and obtain other relevant information based on the image of the object.

The face visual search service device is configured to detect and determine whether the image data contains a human face. If no face is contained therein, then end the face visual search service. If any face is contained, then determine the position information of the face in the picture corresponding to the image data; based on the position information, recognize the specific face image, and determine the name corresponding to the face image.

The text visual search service device is configured to detect and determine whether the image data contains text content. If no text content is contained therein, then end the text visual search service. If any text content is contained, then determine the position information of the text content in the picture corresponding to the image data, and recognize the specific text content based on the position information.

Based on the embodiments of the present disclosure, when recognizing and obtaining the classified type information, and determining the corresponding name, relevant information can be further retrieved for further comprehensive applications, which enhances the user experience. That is, after the classified type information is recognized and the corresponding name is determined by the visual search service device corresponding to the respective classified type information, relevant detailed information can further be retrieved.

The above object visual search service device is also configured to search in a corresponding database for detailed information in accordance with the recognized object, such as year of production of the object, etc. Finally, the object visual search results can be obtained, which may include the type information, i.e. object, position information of the object in the picture, name of the object and other relevant information searched out in the above process.

The above face visual search service device is also configured to search in a corresponding database for detailed information in accordance with the recognized face image. For example, other face images similar to the face image, name of the person in the face image, etc. Based on the name searched out, biography of the person as well as other relevant information can further be searched out. For example, when the person is a star, link addresses (such as home address, blog address, microblog address, etc.) associated with the star can be obtained. Finally, the face visual search results can be obtained, which may include the type information, i.e. human face, position information of the face in the picture, name of the face and other relevant information searched out in the above.

The above object visual search service device is also configured to search in a corresponding database for detailed information in accordance with the text content. For example, when the text content is website information, then indicate the specific link address, etc. Finally, the text visual search results can be obtained, which may include the type information, i.e. text, position information of the text in the picture, name of the text and other relevant information searched out in the above.

In addition, in the present embodiment, the user may specify the types of classified visual search services to be conducted to the sent image data, such as conducting only face visual search service or scenery visual search service, etc. Therefore, the classified forwarding rule can be set as followings.

When the above image recognition request of cloud service contains classified type information, i.e., the user specifies a certain type of classified visual search service, then the image data is forwarded to the respective classified visual search service device corresponding to the specified classified visual search service. For example, in the system as shown in FIG. 4, if the object and the face visual search services are specified in the image recognition request of cloud service, then the cloud service access device 4021 will only forward the image data to the object visual search service device and the face visual search service device, and there is no need to forward the image data to the text visual search service device, barcode visual search service device and devices of other types.

If no classified type information is contained in the recognition request of cloud service, then the cloud service access device 4021 will forward the image data to the respective visual search service devices corresponding to all the visual search services.

In a specific implementation, upon receiving the image recognition request of cloud service sent by the client 401, the request can be preprocessed by the cloud service access device 4021 to verify its security. That is, the above cloud service access device 4021 is also configured to perform preprocessing operations to the image recognition request of cloud service.

The preprocess operations mainly include verification of the image recognition request of cloud service. For example, determine whether the request is valid, so as to avoid any illegal access request. Security verification can be implemented in a conventional manner, which will not go into detail here.

A specific example will be illustrated in detail in the following description. In this example, it is not specified in the request sent by the client which type of classified visual search service will be conducted to the image data; the description, however, shall not be understood as limitative to the scope of the present disclosure.

In the specific example, the specific process can be described as follows.

The client 401 sends to a server 402 via a network (e.g. Internet) an image recognition request of cloud service, wherein the request contains the image data of the picture to be visually searched.

Upon receiving the image recognition request of cloud service, the cloud service access device 4021 of the server 402 performs preprocess operation to the request, verifies its security, and determines whether the request is valid. If the security verification is passed, then enter the next step. Otherwise, end the processing of the request, or return to the client feedback of error or illegal request After passing the security verification, the cloud service access device 4021 analyzes to determine whether the image recognition request of cloud service contains the classified type information, i.e., determining whether the user has specified a certain type of classified visual search service. If there is a specified service, then forward the image data in the request to the respective classified visual search service device corresponding to the classified visual search service in accordance with the classified type information; and if there is no specified service, then forward the image data in the request to the classified visual search service devices corresponding to all the classified visual search services, respectively.

In this specific example of the embodiment, it is not specified in the request which type of classified visual search service will be conducted to the image data. That is, in this example, the image data in the request is forwarded to all the classified visual search services, respectively. Due to different specific settings, the visual search services contained in the server 402 may vary and may not be exhaustive. As a result, in the following description, all the visual search services including face visual search service, physical visual search service, text visual search service are taken as an example, and the description shall not be understood as limitative to the scope of the present disclosure.

Upon receiving the forwarded image data, the face visual search service device firstly detects to determine whether a face image is contained in the image data. If no face image is contained therein, then end the face visual search service. If any face image is contained, then determine the position information of the face image in the picture corresponding to the image data. The position information usually includes a coordinate range of the region of the face image in the picture. Then, based on the position information, recognize the specific face image, give the name in accordance with the face image, and search in a corresponding database for detailed information in accordance with the recognized face image. For example, other face images similar to the face image, name of the person in the face image, etc. Based on the name searched out, biography of the person as well as other relevant information can further be searched out. For example, when the person is a star, link addresses (such as home address, blog address, microblog address, etc.) associated with the star can be obtained. Finally, the face visual search results can be obtained, which may include the type information, i.e. human face, position information of the face in the picture, name of the face and other relevant information searched out in the above process.

Upon receiving the forwarded image data, the object visual search service device firstly detects to determine whether an object is contained in the image data. If no object is contained therein, then end the object visual search service. If any image of the object is contained, then determine the position information of the object in the picture corresponding to the image data. The position information usually includes a coordinate range of the region of the object in the picture. Then, based on the position information, recognize the specific image of the object, match the object to a specific category and obtaining other relevant information based on the image of the object, and then search in a corresponding database for detailed information in accordance with the recognized object, such as year of production of the object, etc. Finally, the object visual search results can be obtained, which may include the type information, i.e. object, position information of the object in the picture, name of the object and other relevant information searched out in the above process.

Upon receiving the forwarded image data, the text visual search service device firstly detects to determine whether text content is contained in the image data. If no text content is contained therein, then end the text visual search service. If any text content is contained, then determine the position information of the text content in the picture corresponding to the image data. The position information usually includes a coordinate range of the region of the text content in the picture. Then, based on the position information, recognize the specific text content, and search in a corresponding database for detailed information in accordance with the text content. For example, when the text content website information, then indicate the specific link address, etc. Finally, the text visual search results can be obtained, which may include the type information, i.e. text, position information of the text in the picture, name of the text and other relevant information searched out in the above process.

After getting the classified visual search results of the face, object and text visual search services, the results are summarized and returned, by the visual search results summarization device 4023, to the client 401. Upon receiving the results by the client 401, the results can be shown in combination with a picture. Take human face for example, based on the position information of face in the picture, the type information, name of the face and other relevant information can be displayed within the range corresponding to the picture, so that user can view on the client more information related to the picture. If the returned classification of visual search result has link information therein, the user can access a specific page by clicking on the link. Specific extension after obtaining the classified visual search results can be set as many ways according to actual needs, which will not go into details herein.

In another implementation, visual search system based on cloud service according to the embodiment may include the above mentioned client 401. The client 401 can be of any type including but not limited to: mobile terminal, PC client, WEB client, tablet PC, notebook computer, automotive electronic system, PDA, etc.

The interaction between the client and the server process, including sending by the client image recognition request of cloud service to the server, and sending by the server classified visual search results to the client, sends the classification of, can use any communication protocol according to needs, including but not limited to HTTP protocol, TCP protocol, etc.

In one implementation of the embodiment of the present disclosure, the client can be chosen as one that can be located. When sending, by a client, an image recognition request of cloud service to the server, the position information (such as the latitude and longitude information, etc.) of the client can also be sent to the server, and when the server returns a classified visual search result to the client, other relevant information can also be given simultaneously based on the position information. Take the scene visual search service for example, when the scene and the location of the scene are determined, the route information to the scene can be given based on the position information of the place where the client is.

In this embodiment, the implementation of the classified visual search services corresponding to the respective classified visual search service devices can be the same with the above embodiment, which will not go into details herein.

Embodiment 2

Figure 5:
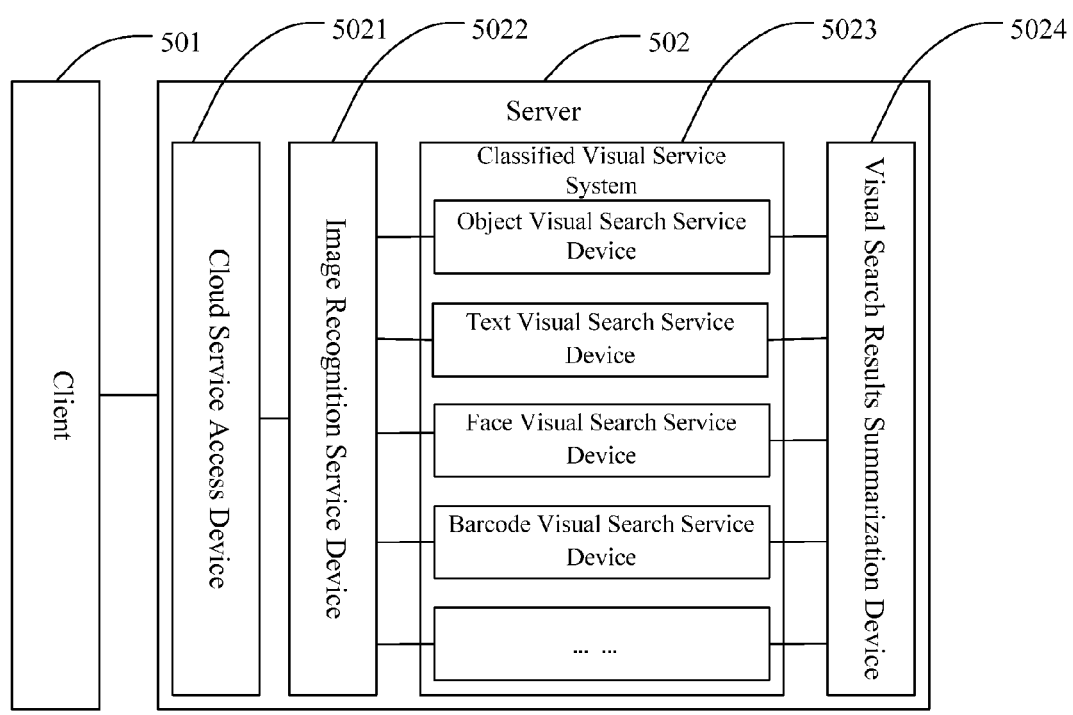
FIG. 5 is a structural schematic diagram showing a system for visual searching based on cloud service according to the second embodiment of the present disclosure.

FIG. 5 is a structural schematic diagram showing a system for visual searching based on cloud service according to the second embodiment of the present disclosure. The difference between this embodiment and the first embodiment mainly lies in that, in the client 502, a unified image recognition service device 5022 is used to detect and determine what classified type information are contained in the image data.

As illustrated in FIG. 5, a visual search system based on cloud service in accordance with the embodiment includes a server 502, the server 502 including:

a cloud service access device 5021, configured to receive from the client 501 an image recognition request of cloud service, the request containing image data that needs image recognition;

an image recognition service device 5022 connected to the cloud service access device 5021, configured to detect the respective classified type information contained in the image data of the request and the position information of the respective classified type information the image data, and forward, according to a classified forwarding rule established in accordance with the respective classified type information, the image data in the request and the corresponding position information to a corresponding classified visual search service in a classified visual service system 5023;

a classified visual service system 5023 connected to the image recognition service device 5022, configured to receive the image data sent by the image recognition service device 5022, and recognize, by the respective classified visual search service, the corresponding classified type information in the image data, and determine the name corresponding to the classified type information; and a visual search results summarization device 5024 connected to the classified visual service system 5023, configured to send, upon summarization, the respective corresponding classified visual search results to the client 501, the result including the above determined the classified type information and the corresponding name.

According to this embodiment, firstly determine what classified type information is contained in the image data, and then forward the image data to the corresponding classified visual search service. This avoids the unnecessary processing of other classified visual search services.

The above classified visual search services may include services in a variety of specific areas. Different settings can be done depending on the specific needs, for example, it may include, but is not limited to, services of the following categories: object visual search service, text visual search service, face visual search service, barcode visual search service, scenery visual search service, Logo visual search service, book visual search service, CD visual search service, etc. In case of implementation, any one or any combination of these categories of visual search services can be used.

Correspondingly, the classified type information is in accordance with the corresponding classified visual search service, the above classified type information may include types of object, text, face, barcode, scenery, Logo, books, CD and other types. In case of implementation, in accordance with the different types of visual search services used above, the classified type information may include any one or any combination of the types of object, text, face, barcode, scenery, Logo, books, CD, etc.

As shown in FIG. 5, in the embodiment, the above classified visual service system 5023 may specifically include but not limited to the object visual search service device, face visual search service device, text visual search service device, barcode visual search service device. For example, it may also include scenery visual search service device, Logo visual search service device, book visual search service device, CD visual search service device, etc.

The object visual search service device is configured to recognize, according to the image data forwarded by the image recognition service device 5022 and the corresponding position information, the specific image of the object, and match the object to a specific category and obtain other relevant information based on the image of the object, give the name of the object, and obtain a specific object visual search result. The result may include the type information, i.e. object, position information of the object in the picture, and name of the object.

The face visual search service device is configured to recognize, according to the image data forwarded by the image recognition service device 5022 and the corresponding position information, the specific image of the face, give the name of the face, and finally obtain a specific face visual search result. The result may include the type information, i.e. face, position information of the face in the picture, and name of the face.

The text visual search service device is configured to recognize, according to the image data forwarded by the image recognition service device 5022 and the corresponding position information, the specific image of the text, and finally obtain a specific text visual search result. The result may include the type information, i.e. text, position information of the text in the picture, and name of the text.

Based on the embodiments of the present disclosure, when recognizing and obtaining the specific type of information, detailed information relevant to the specific type of information can be further retrieved for further comprehensive applications, which enhances the user experience. That is, after the classified type information is recognized by the respective specific types of visual search service devices, detailed information relevant to the specific type of information can be further retrieved.

The above object visual search service device is also configured to search in a corresponding database for detailed information in accordance with the recognized object, such as year of production of the object, etc. At this time, the above object visual search result also includes the other relevant information obtained by searching.

The above face visual search service device is also configured to search in a corresponding database for detailed information in accordance with the recognized face image. For example, face images similar to a face image, name of the person in the face image, etc. Based on the name searched out, biography of the person as well as other relevant information can further be searched out. For example, when the person is a star, link addresses (such as home address, blog address, microblog address, etc.) associated with the star can be obtained. At this time, the above face visual search result also includes the other relevant information obtained by searching.

The above object visual search service device is also configured to search for and determine other information relevant to the text content. For example, when the text content is website information, then indicate the specific link address, etc. At this time, the above text visual search result also includes the other relevant information obtained by searching.

In addition, in the present embodiment, the user may specify the types of classified visual search services to be conducted to the sent image data, such as conducting only face visual search service or scenery visual search service, etc. At this time, the image recognition service device 5022 can directly forward the image data to the respective specified classified visual search services, without detection of what classified type information is contained in the image data.

In an implementation of one embodiment of the present disclosure, the types of classified type information contained in the image data are detected by the image recognition service device 5022. After forwarding the image data to a corresponding classified visual search service, it is possible not to detect whether or not the image data contains corresponding classified type information when recognizing the corresponding classified type information of the image data by the respective classified visual search service, which may specifically include:

recognize, based on the position information detected by the respective corresponding classified visual search service, the classified type information represented by the image data corresponding to the position information, and determine the corresponding name.

Nevertheless, if the user specifies the classified visual search service to be conducted to the sent image data, and what classified type information is contained in the image data is not detected by the image recognition service device 5022, then it is necessary to detect whether the image data includes corresponding classified type information.

In a specific implementation, upon receiving the image recognition request of cloud service sent by the client 501, the request can be preprocessed by the cloud service access device 5021 to verify its security. That is, the above the cloud service access device 5021 is also configured to perform preprocess operation to the image recognition request of cloud service.

The preprocess operations mainly include verification of the image recognition request of cloud service. For example, determine whether the request is valid, so as to avoid any illegal access request. Security verification can be implemented in a conventional manner, which will not go into detail here.

A specific example will be illustrated in detail in the following description. In this example, it is not specified in the request sent by the client which type of classified visual search service will be conducted to the image data; the description, however, shall not be understood as limitative to the scope of the present disclosure.

In this specific example, the specific process of example can be described as follows.

A client 501 sends to a server 502 via a network (e.g. Internet) an image recognition request of cloud service, wherein the request contains the image data of the picture to be visually searched.

Upon receiving the image recognition request of cloud service, the cloud service access device 5021 of the server 502 performs preprocess operation to the request, verifies its security, and determines whether the request is valid. If the security verification is passed, then enter the next step. Otherwise, end the processing of the request, or return to the client feedback of error or illegal request.

After passing the security verification, the image recognition service device 5022 analyzes to determine whether the image recognition request of cloud service contains the classified type information, i.e., determining whether the user has specified a certain type of classified visual search service. If there is a specified service, then forward the image data in the request to the classified visual search service devices corresponding to the classified visual search services corresponding to the classified type information; and if there is no specified service, then detect what classified type information is contained in the image data, and detect the position information of the respective classified type information in the picture corresponding to the image data, and forward the image data in the request and the corresponding position information to the classified visual search service devices corresponding to the classified visual search services, respectively.

In this specific example of the embodiment, it is not specified in the request that which type of classified visual search service will be conducted to the image data, and the classified type information contained in the image data includes face, object and text. That is, in this example, the image data in the request is forwarded to the face device, object visual search service device and text visual search service device, respectively.

Upon receiving the forwarded image data, the face visual search service device recognizes a specific face image based the detected position information of the face in the picture corresponding to the image data, gives the name in accordance with the face image, and searches in a corresponding database for detailed information in accordance with the recognized face image. For example, other face images similar to the face image, name of the person in the face image, etc. Based on the name searched out, biography of the person as well as other relevant information can further be searched out. For example, when the person is a star, link addresses (such as home address, blog address, microblog address, etc.) associated with the star can be obtained. Finally, the detailed face visual search results can be obtained, which may include the type information, i.e. human face, position information of the face in the picture, name of the face and other relevant information searched out in the above.

Upon receiving the forwarded image data, the object visual search service device recognizes a specific image of the object based the detected position information of the object in the picture corresponding to the image data, match the object to a specific category and obtaining other relevant information based on the image of the object, and then search in a corresponding database for detailed information in accordance with the recognized object, such as year of production of the object, etc. Finally, the object visual search results can be obtained, which may include the type information, i.e. object, position information of the object in the picture, name of the object and other relevant information searched out in the above process.

Upon receiving the forwarded image data, the text visual search service device recognizes the specific text content according to the position information of the text in the picture corresponding to the detected text, and searches to determine other information relevant to the text content. For example, when the text content website information, then indicate the specific link address, etc. Finally, the text visual search results can be obtained, which may include the type information, i.e. text, position information of the text in the picture, name of the text and other relevant information searched out in the above process.

After getting the classified visual search results of the face, object and text visual search service devices, the results are summarized and returned, by the visual search result summarization device 5024, to the client 501. Upon receiving the results by the client 501, the results can be shown in combination with a picture. Take human face for example, based on the position information of face in the picture, the type information, name of the face and other relevant information can be displayed within the range corresponding to the picture, so that user can view on the client more information related to the picture. If the returned classification of visual search result has link information therein, the user can access a specific page by clicking on the link. Specific extension after obtaining the classified visual search results can be set as many ways according to actual needs, which will not go into details herein.

In another implementation, the visual search system based on cloud service according to the embodiment may include the above mentioned client 501. The client 501 can be of any type including but not limited to: mobile terminal, PC client, WEB client, tablet PC, notebook computer, automotive electronic system, PDA, etc.

Other features of the second embodiment are the same as that of the first embodiment, which will not go into details herein.

Embodiment 3

Figure 6:
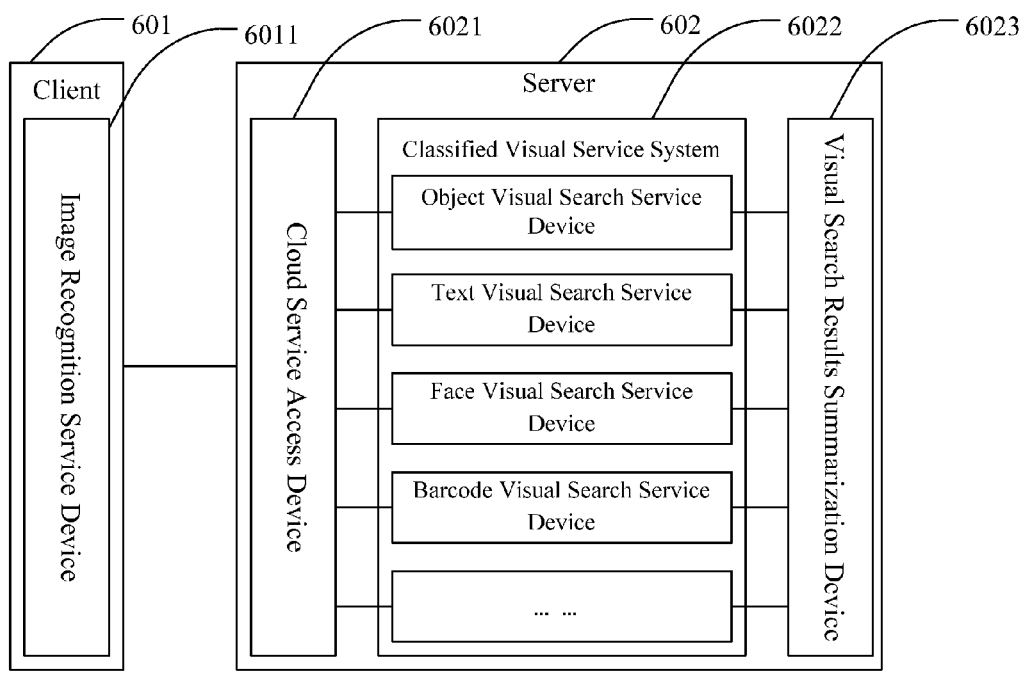
FIG. 6 is a structural schematic diagram showing a system for visual searching based on cloud service according to a third embodiment of the present disclosure.

FIG. 6 is a structural schematic diagram showing a system for visual searching based on cloud service according to a third embodiment of the present disclosure. The difference between this embodiment and the second embodiment mainly lies in that, an image recognition service device is provided at the client side to detect and determine what classified type information are contained in the image data.

As illustrated in FIG. 6, a visual search system based on cloud service in accordance with the embodiment includes a client 601 and a server 602.

The client 601 includes:

an image recognition service device 6011, configured to detect the respective classified type information contained in the image data of the request and the position information of the respective classified type information the image data, and forward, according to the detected classified type information and the corresponding position information, image recognition request of cloud service to the server, the request containing image data that needs image recognition, and the classified type information and corresponding position information detected above.

The server 602 includes:

a cloud service access device 6021, configured to receive from the client 601 an image recognition request of cloud service, and forward, according to set classified forwarding rule, the image data contained in the request to a corresponding classified visual search service in a classified visual service system 6022;

a classified visual service system 6022 connected to the cloud service access device 6021, configured to receive the image data and the corresponding position information sent by the cloud service access device 6021, and recognize, by the respective corresponding classified visual search service, corresponding classified type information in the image data, and determine the name of the image data in accordance with the respective classified type information; and a visual search results summarization device 6023 connected to the classified visual service system 6022, configured to send, upon summarization, the respective corresponding classified visual search results to the client 601, the result including the above determined the classified type information and the corresponding name.

According to this embodiment, the client 601 firstly determines what types of classified type information is contained in the image data, and send the image recognition request of cloud service to the server 602. The server 602 recognizes the specific classified type information in the image data, so as to avoid the unnecessary processing of other classified visual search services.

The above classified visual search services may include services in a variety of specific areas. Different settings can be done depending on the specific needs, for example, it may include, but is not limited to, services of the following categories: object visual search service, text visual search service, face visual search service, barcode visual search service, scenery visual search service, Logo visual search service, book visual search service, CD visual search service, etc. In case of implementation, any one or any combination of these categories of visual search services can be used.

Accordingly, in the present embodiment, the above classified visual service system 6022 may specifically include but not limited to, as shown in FIG. 6, specific types of visual search service devices such as object visual search service device, face visual search service device, text visual search service device, barcode visual search service device, etc. It may further includes for example scenery visual search service device, Logo visual search service device, book visual search service device and CD visual search service device, etc.

The object visual search service device is configured to recognize the specific image of the object according to the image data forwarded by the cloud service access device 6021 and the corresponding position information, and match the object to a specific name and obtain other relevant information based on the image of the object.

The face visual search service device is configured to recognize the specific face image according to the image data forwarded by the cloud service access device 6021 and the corresponding position information, and give the corresponding name of the face image.

The text visual search service device is configured to recognize the specific text content according to the image data forwarded by the cloud service access device 6021 and the corresponding position information.

Based on the embodiments of the present disclosure, when recognizing and obtaining the classified type information, and determining the corresponding name, relevant information can be further retrieved for further comprehensive applications, which enhances the user experience. That is, after the classified type information is recognized and the corresponding name is determined by the visual search service device corresponding to the respective classified type information, relevant detailed information can further be retrieved.

The above object visual search service device is also configured to search in a corresponding database for detailed information in accordance with the recognized object, such as year of production of the object, etc. Finally, the object visual search results can be obtained, which may include the type information, i.e. object, position information of the object in the picture, name of the object and other relevant information searched out in the above process.

The above face visual search service device is also configured to search in a corresponding database for detailed information in accordance with the recognized face image. For example, other face images similar to the face image, name of the person in the face image, etc. Based on the name searched out, biography of the person as well as other relevant information can further be searched out. For example, when the person is a star, link addresses (such as home address, blog address, microblog address, etc.) associated with the star can be obtained. Finally, the face visual search results can be obtained, which may include the type information, i.e. human face, position information of the face in the picture, name of the face and other relevant information searched out in the above.

The above object visual search service device is also configured to search in a corresponding database for detailed information in accordance with the text content. For example, when the text content is website information, then indicate the specific link address, etc. Finally, the text visual search results can be obtained, which may include the type information, i.e. text, position information of the text in the picture, name of the text and other relevant information searched out in the above.

In addition, in the present embodiment, the user may specify the types of classified visual search services to be conducted to the sent image data, such as conducting only face visual search service or scenery visual search service, etc. At this time, the image recognition service device 6011 can directly send, to the server 602, the image recognition request of cloud service containing a specified type, which will not go into detail herein.

A specific example will be illustrated in detail in the following description. In this example, it is not specified in the request received by the client which type of classified visual search service will be conducted to the image data; the description, however, shall not be understood as limitative to the scope of the present disclosure.

In this specific example, the specific process of example can be described as follows.

Upon receiving, by the client 601, an image recognition request of cloud service triggered by mouse click, finger touch, etc., the image recognition service device 6011 detects whether the user has specified a certain type of classified visual search service. If there is a specified service, then send, to the server, the image recognition request of cloud service containing the specified classified type information; and if there is no specified service, then detect what classified type information is contained in the image data, and detect the position information of the respective classified type information in the picture corresponding to the image data, and send, to the server, the image recognition request of cloud service containing the detected classified type information, the corresponding position information and the picture of the image data. In the following description of the specific example, the user dose not specified a classified visual search service, and the classified type information contained in the image data includes face, object and text.

Upon receiving, by the cloud service access device 6021 of the client 602, the image recognition request of cloud service containing the detected classified type information, the corresponding position information and the picture of the image data, the request is preprocessed. The security of the request is verified to determine whether the request is valid. If the security verification is passed, then perform the next operation. Otherwise, end the processing of the request, or return to the client 601 feedback of error or illegal request.

After passing the security verification, the cloud service access device 6021 forwards the image data in the request and the corresponding position information to the respective classified visual search service devices corresponding to the classified visual search services. And, if there is no specified service, then forward the image data in the request to all the classified visual search services, respectively. When the type information detected by the image recognition service device 6011 includes face, object and text, then forward, to the face visual search service device, the object visual search service device and the text visual search service device, respectively, the image data in the request and the corresponding position information.

Upon receiving the forwarded image data, the face visual search service device recognizes the specific face image according to position information of the detected face in the picture corresponding to the image data, gives the name in accordance with the face image, and searches in a corresponding database for detailed information in accordance with the recognized face image. For example, face images similar to the face image, name of the person in the face image, etc. Based on the name searched out, biography of the person as well as other relevant information can further be searched out. For example, when the person is a star, link addresses (such as home address, blog address, microblog address, etc.) associated with the star can be obtained. Finally, the face visual search results can be obtained, which may include the type information, i.e. human face, position information of the face in the picture, name of the face and other relevant information searched out in the above process.

Upon receiving the forwarded image data, the object visual search service device recognizes the specific image of the object according to position information of the detected object in the picture corresponding to the image data, matches the object to a specific category and obtaining other relevant information based on the image of the object, and then searches in a corresponding database for detailed information in accordance with the recognized object, such as year of production of the object, etc. Finally, the object visual search results can be obtained, which may include the type information, i.e. object, position information of the object in the picture, name of the object and other relevant information searched out in the above process.

Upon receiving the forwarded image data, the text visual search service device recognizes the text content according to position information of the detected text in the picture corresponding to the image data, searches for detailed information in accordance with the text content. For example, when the text content website information, then indicate the specific link address, etc. Finally, the text visual search results can be obtained, which may include the type information, i.e. text, position information of the text in the picture, name of the text and other relevant information searched out in the above process.

After getting the classified visual search results of the face, object and text visual search service devices, the results are summarized and returned, by the visual search results summarization device 6023, to the client 601. Upon receiving the results by the client 601, the results can be shown in combination with a picture. Take human face for example, based on the position information of face in the picture, the type information, name of the face and other relevant information can be displayed within the range corresponding to the picture, so that user can view on the client more information related to the picture. If the returned classification of visual search result has link information therein, the user can access a specific page by clicking on the link. Specific extension after obtaining the classified visual search results can be set as many ways according to actual needs, which will not go into details herein.

The client 601 of this embodiment can be of any type including but not limited to: mobile terminal, PC client, WEB client, tablet PC, notebook computer, automotive electronic system, PDA, etc.

Other features of the third embodiment are the same as that of the first embodiment, which will not go into details herein.

It should be noted that for a person skilled in the art, partial or full process to realize the methods in the above embodiments can be accomplished by related hardware instructed by a computer program. The computer program can be stored in a non-transitory computer readable storage medium. The computer program can include computer-executable instructions for performing processes of the embodiments described above. Exemplary computer readable storage media include disks such as hard disks and optical disks. Further, during processing, the hardware can store a copy of the computer program and/or its computer-executable instructions into a Read-Only Memory or a Random Access Memory, etc.

The embodiments are chosen and described in order to explain the principles of the disclosure and their practical application so as to allow others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for visual searching based on cloud service, comprising:
    receiving, from a client, an image recognition request of cloud service, the request containing image data;
    forwarding, according to a set classified forwarding rule, the image data to a corresponding classified visual search service, wherein the forwarding comprises:
        detecting classified type information contained in the image data, and forwarding the image data to the classified visual search service corresponding to the detected image data;
    detecting, by the respective corresponding classified visual search service, whether the image data contains the corresponding classified type information; if yes, detect the position information of the classified type information in the image data, and recognize according to the position information a corresponding name;
    recognizing, by the respective corresponding classified visual search services, the corresponding classified type information in the image data, and determining the corresponding name of the image data in accordance with the respective classified type information;
    obtaining a classified visual search result, the result including the classified type information and the corresponding name; and
    summarizing and sending, to the client, the classified visual search result of the corresponding classified visual search service.

2. The method of claim 1, further comprising, before the forwarding, the step of:
    recognizing the respective classified type information contained in the request, and the position information of the respective classified type information in the image data; and
    setting a classified forwarding rule according to the recognized respective classified type information and the position information, and forwarding, to the classified visual search service in accordance with the recognized classified type information, the image data and the corresponding position information.

3. The method of claim 2, wherein the setting comprises:
    if the image recognition request of cloud service contains the classified type information, then forward the image data to the respective classified visual search service in accordance with the classified type information; and
    if the image recognition request of cloud service does not contain the classified type information, then forward the image data to all the visual search services.

4. The method of claim 1, further comprising: after the receiving, the step of: preprocessing the image recognition request of cloud service, the preprocessing comprising operation of security verification.

5. The method of claim 1, further comprising, after the determining and before the summarizing and sending, the step of: retrieving, from the respective classified visual search service, detailed information relevant to the specified type according to the recognized classified type information and the name; the classified visual search result comprising the retrieved detailed information.

6. The method of claim 1, wherein the classified visual search service comprises one or more of: object visual search service, text visual search service, face visual search service, barcode visual search service, scenery visual search service, Logo visual search service, book visual search service, and compact disc (CD) visual search service, and wherein the classified type information comprises one or more of: object, text, face, barcode, scenery, Logo, books, and CD.

7. A visual search system based on cloud service, comprising:
    a server, comprising:
        a cloud service access device, configured to:
            receive, from a client, an image recognition request of cloud service containing image data, and forward, according to a set classified forwarding rule, the image data to a corresponding classified visual search service in a classified visual service system;

a classified visual service system, configured to:
  detect, with the respective classified visual search service, whether the image data contains the corresponding classified type information; if yes, detect the position information of the classified information in the image data, and recognize according to the position information a corresponding name;
  recognize, with the respective corresponding classified visual search service, the corresponding classified type information in the image data,
  determine the corresponding name of the image data in accordance with the respective classified type information to obtain a classified visual search result, the result containing the classified type information and the corresponding name;

a visual search results summarization device, configured to:
  send, upon summarization, the respective corresponding classified visual search results to a client; and an image recognition service device arranged in the client, configured to:
  detect the respective classified type information contained in the image and the position information of the respective classified type information in the image data, and
  send, to the server, the image recognition request of cloud service according to the detected classified type information, the request comprising the recognized classified type information, the corresponding position information and the image data of the image.

8. The system of claim 7, further comprising:
an image recognition service device connected between the cloud service access device and the classified visual service system, configured to:
  recognize the respective classified type information contained in the image data of the image recognition request of cloud service and the position information of the respective classified type information in the image data, and
  set a classified forwarding rule according to the recognized respective classified type information and the position information, and forward, to the corresponding classified visual search service, the image data and the position information in accordance with the recognized classified type information.

9. The system of claim 8, wherein the setting comprises:
if the image recognition request of cloud service contains the classified type information, then forward the image data to the respective classified visual search service in accordance with the classified type information; and
if the image recognition request of cloud service does not contain the classified type information, then forward the image data to all the visual search services.

10. The system of claim 7, wherein the cloud service access device is further configured to perform preprocessing operation to the image recognition request of cloud service, the preprocessing comprising operation of security verification.

11. The system of claim 7, wherein the classified visual service system is further configured to:
retrieve, from the respective classified visual search service, detailed information relevant to the specified type according to the recognized classified type information and the name; the classified visual search result comprising the retrieved detailed information.

12. The system of claim 7, wherein the classified visual search service comprises any one or more of the followings: object visual search service, text visual search service, face visual search service, barcode visual search service, scenery visual search service, Logo visual search service, book visual search service, and compact disc (CD) visual search service, and the classified type information comprises any one or more of the followings: object, text, face, barcode, scenery, Logo, books, and CD.

13. The system of claim 7, further comprising the client.

14. A non-transitory computer-readable storage medium comprising computer-executable instructions for visual searching based on cloud service, the computer-executable instructions comprising instructions for:
receiving, from a client, an image recognition request of cloud service, the request containing image data;
forwarding, according to set classified forwarding rule, the image data to a corresponding classified visual search service, wherein the forwarding comprises: detecting the classified type information contained in the image data, and forwarding the image data to the classified visual search service corresponding to the detected image data;
detecting, by the respective corresponding classified visual search service, whether the image data contains the corresponding classified type information; if yes, detect the position information of the classified type information in the image data;
recognizing, according to the position information, a corresponding name;
recognizing, by the respective corresponding classified visual search services, the corresponding classified type information in the image data, and determining the name of the image data in accordance with the respective classified type information, and obtaining a classified visual search result, the result including the classified type information and the corresponding name; and
summarizing and sending, to a client, the classified visual search result of the corresponding classified visual search service.

15. The non-transitory computer-readable storage medium of claim 14, the computer-executable instructions further comprising instructions for:
before the forwarding, recognizing the respective classified type information contained in the request, and the position information of the respective classified type information in the image data;
setting a classified forwarding rule according to the recognized respective classified type information and the position information; and
forwarding, to the classified visual search service in accordance with the recognized classified type information, the image data the corresponding position information.

16. The non-transitory computer-readable storage medium of claim 15, wherein the setting comprises:
if the image recognition request of cloud service contains the classified type information, then forward the image data to the respective classified visual search service in accordance with the classified type information; and
if the image recognition request of cloud service does not contain the classified type information, then forward the image data to all the visual search services.

17. The non-transitory computer-readable storage medium of claim 14, the computer-executable instructions further comprising instructions for:

after the receiving: preprocessing the image recognition request of cloud service, the preprocessing comprising operation of security verification.

18. The non-transitory computer-readable storage medium of claim 14, the computer-executable instructions further comprising instructions for:
after the determining and before the summarizing and sending: retrieving, from the respective classified visual search service, detailed information relevant to the specified type according to the recognized classified type information and the name; the classified visual search result comprising the retrieved detailed information.

* * * * *